(12) United States Patent
Ben-Eliezer et al.

(10) Patent No.: US 10,475,051 B2
(45) Date of Patent: Nov. 12, 2019

(54) SHOPPING PATTERN RECOGNITION

(71) Applicant: NCR Corporation, Duluth, GA (US)

(72) Inventors: Dror Ben-Eliezer, Pardes Hanna-Karkur (IL); Jonathan Roy David, Kfar-Saba (IL)

(73) Assignee: NCR Corporation, Atlanta, GA (US)

(*) Notice: Subject to any disclaimer, the term of this patent is extended or adjusted under 35 U.S.C. 154(b) by 272 days.

(21) Appl. No.: 14/468,455

(22) Filed: Aug. 26, 2014

(65) Prior Publication Data
US 2016/0063511 A1 Mar. 3, 2016

(51) Int. Cl.
*G06Q 30/02* (2012.01)
*G06Q 30/06* (2012.01)

(52) U.S. Cl.
CPC ..... *G06Q 30/0201* (2013.01); *G06Q 30/0631* (2013.01)

(58) Field of Classification Search
CPC .. G06Q 10/06375; G06Q 20/40; G06Q 20/34; G06Q 30/0255; G06Q 30/0601; G06Q 30/0215; G06Q 30/02; G06Q 10/063114
See application file for complete search history.

(56) References Cited

U.S. PATENT DOCUMENTS

| | | | | |
|---|---|---|---|---|
| 5,974,396 A | * | 10/1999 | Anderson | G06Q 30/02 705/14.25 |
| 6,292,797 B1 | * | 9/2001 | Tuzhilin | G06F 16/2465 |
| 7,792,706 B2 | * | 9/2010 | Tirumalareddy | G06Q 30/02 705/26.7 |
| 7,945,473 B2 | * | 5/2011 | Fano | G06N 20/00 705/14.1 |
| 8,352,315 B2 | * | 1/2013 | Faith | G06Q 10/06375 705/14.1 |
| 8,359,274 B2 | * | 1/2013 | Yoder | G06Q 20/40 705/64 |

(Continued)

FOREIGN PATENT DOCUMENTS

| | | | | |
|---|---|---|---|---|
| EP | 2463818 A1 | * | 6/2012 | G06Q 30/02 |
| EP | 2463818 A1 | * | 6/2012 | G06Q 30/02 |

(Continued)

OTHER PUBLICATIONS

Adomavicius, Gediminias & Tuzhilin, Alexander. "Using data mining methods to build customer profiles." 0018-9162/01, IEEE, (2001): pp. 74-82.*

(Continued)

*Primary Examiner* — Thomas L Mansfield
*Assistant Examiner* — Derick J Holzmacher
(74) *Attorney, Agent, or Firm* — Schwegman, Lundberg & Woessner

(57) ABSTRACT

Shopping patterns for a customer with respect to a particular product that is repeatedly purchased by the customer with a given frequency are recognized across multiple communication channels by mining transaction histories for the customer over each of the channels. The shopping patterns are processed on a per-communication channel basis for making recommendations, providing reminders, and/or providing default shopping lists on behalf of the customer.

20 Claims, 4 Drawing Sheets

(56) References Cited

U.S. PATENT DOCUMENTS

| | | | | |
|---|---|---|---|---|
| 8,533,857 | B2* | 9/2013 | Tuchman | H04L 63/104 705/304 |
| 8,650,079 | B2* | 2/2014 | Fano | G06Q 30/02 705/14.43 |
| 8,756,095 | B2* | 6/2014 | Gilbert | G06Q 10/06375 705/7.31 |
| 2004/0098740 | A1* | 5/2004 | Maritzen | G06Q 20/00 725/27 |
| 2004/0133474 | A1* | 7/2004 | Tami | G06Q 30/02 705/16 |
| 2005/0149392 | A1* | 7/2005 | Gold | G06Q 30/0252 705/14.5 |
| 2005/0189414 | A1* | 9/2005 | Fano | G06Q 30/02 235/383 |
| 2005/0189415 | A1* | 9/2005 | Fano | G06Q 30/0251 235/383 |
| 2006/0059049 | A1* | 3/2006 | Morris | G06Q 30/02 705/26.1 |
| 2006/0143079 | A1* | 6/2006 | Basak | G06Q 30/0204 705/14.1 |
| 2006/0195358 | A1* | 8/2006 | Muldoon | G06Q 20/20 705/14.25 |
| 2006/0235746 | A1* | 10/2006 | Hammond | G06Q 20/387 705/14.26 |
| 2006/0242011 | A1* | 10/2006 | Bell | G06Q 30/02 705/14.25 |
| 2008/0123587 | A1* | 5/2008 | Xu | H04L 12/58 370/329 |
| 2009/0327308 | A1* | 12/2009 | Carter | G06Q 30/02 |
| 2011/0082718 | A1* | 4/2011 | Ghosh | G06Q 20/00 705/7.29 |
| 2011/0231225 | A1* | 9/2011 | Winters | G06Q 20/10 705/7.29 |
| 2013/0018713 | A1* | 1/2013 | Kumar | G06Q 30/0201 705/14.12 |
| 2013/0096997 | A1* | 4/2013 | Benedikt | G06Q 30/0601 705/14.4 |
| 2013/0097002 | A1* | 4/2013 | Dishneau | G06Q 30/02 705/14.25 |
| 2013/0124287 | A1* | 5/2013 | Bjorn | G06Q 30/0222 705/14.23 |
| 2013/0124361 | A1* | 5/2013 | Bryson | G06Q 30/02 705/26.7 |
| 2013/0159224 | A1* | 6/2013 | Blake | G06Q 30/01 706/12 |
| 2014/0074649 | A1* | 3/2014 | Patel | G06Q 30/0631 705/26.7 |
| 2014/0122229 | A1* | 5/2014 | Clark | G06Q 30/0255 705/14.53 |
| 2014/0156449 | A1* | 6/2014 | Ganesan | G06Q 30/0631 705/26.7 |
| 2014/0180790 | A1* | 6/2014 | Boal | G06Q 30/0245 705/14.42 |
| 2014/0214590 | A1* | 7/2014 | Argue | G06Q 30/0631 705/26.7 |
| 2014/0279204 | A1* | 9/2014 | Roketenetz | G06Q 30/0631 705/26.7 |
| 2014/0365273 | A1* | 12/2014 | Hurewitz | G06Q 30/0643 705/7.29 |
| 2015/0032614 | A1* | 1/2015 | Ghosh | G06Q 20/383 705/41 |
| 2015/0039422 | A1* | 2/2015 | Abraham | G06Q 30/0251 705/14.49 |
| 2015/0235161 | A1* | 8/2015 | Azar | G06Q 10/063114 705/7.15 |

FOREIGN PATENT DOCUMENTS

| | | | | |
|---|---|---|---|---|
| EP | 2728535 A1 | * | 5/2014 | G06Q 30/0255 |
| WO | WO 0206983 A2 | * | 1/2002 | G06Q 30/02 |
| WO | WO-0206983 A2 | * | 1/2002 | G06Q 30/02 |
| WO | WO 2005086059 A1 | * | 9/2005 | G06Q 10/087 |
| WO | WO-2005086059 A1 | * | 9/2005 | G06Q 30/02 |
| WO | WO 2007048008 A2 | * | 4/2007 | G06Q 30/02 |
| WO | WO-2007048008 A2 | * | 4/2007 | G06Q 30/02 |
| WO | WO 2012003580 A1 | * | 1/2012 | G06Q 30/02 |
| WO | WO 2013052081 A2 | * | 4/2013 | G06Q 30/0241 |
| WO | WO 2014154304 A1 | * | 10/2014 | G06Q 30/0269 |
| WO | WO-2014154304 A1 | * | 10/2014 | G06Q 30/0269 |

OTHER PUBLICATIONS

Adomavicius, Gediminias & Tuzhilin, Alexander. "Using data mining methods to build customer profiles." 0018-9162/01, IEEE, (2001): pp. 74-82. (Year: 2001).*

Rygielski, Chris, Jyun-Cheng Wang, and David C. Yen. "Data mining techniques for customer relationship management" Technology in society 24.4 (2002): 483-502. (Year: 2002).*

Vaidya, Jaideep, and Chris Clifton. "Privacy-preserving data mining: Why, how, and when." IEEE Security & Privacy 2.6 (2004): 19-27. (Year: 2004).*

Evfimievski, Alexandre, et al. "Privacy preserving mining of association rules." Information Systems 29.4 (2004): 343-364. (Year: 2004).*

Saygin, Yücel, Vassilios S. Verykios, and Ahmed K. Elmagarmid. "Privacy preserving association rule mining." Proceedings Twelfth International Workshop on Research Issues in Data Engineering: Engineering E-Commerce/E-Business Systems RIDE-2EC 2002. IEEE, 2002. (Year: 2002).*

* cited by examiner

SHOPPING PATTERN RECOGNITION

BACKGROUND

Retailers often allow customers to place orders on electronic channels, such as e-commerce websites and mobile devices. Electronic channels enable customers to maintain an electronic cart (shopping cart) where they can add and remove goods before placing an order. Customers usually use the website search engine to search for goods or browse a catalog online. Other shopping methods are based on promotions, loyalty incentives, seasonal offers, etc. To increase sales and improve the shopping experience, retailers recommend items that are most likely to be purchased.

Compared to non-grocery products, such as books or electronics, grocery products have recurring purchasing patterns. Two customers purchasing the same products will have different purchasing patterns, in respect to the purchased quantities and the time between purchases. Yet, existing recommendation techniques fail to consider such patterns that are specific to a consumer and specific to particular products or stores.

SUMMARY

In various embodiments, methods and system for shopping pattern recognition are presented.

According to an embodiment, a method for shopping pattern recognition is provided. Specifically, in an embodiment, a shopping pattern for a customer of a retailer is automatically derived by mining a transaction history for the customer maintained by the retailer. The shopping pattern based at least in part on per-product purchases and frequencies of those purchases. Then, the shopping pattern is communicated to a retail system for the retailer. The shopping pattern can be communicated from an external system (off premises) or within a retailer's data center systems (on premises).

DETAILED DESCRIPTION

Figure 1:
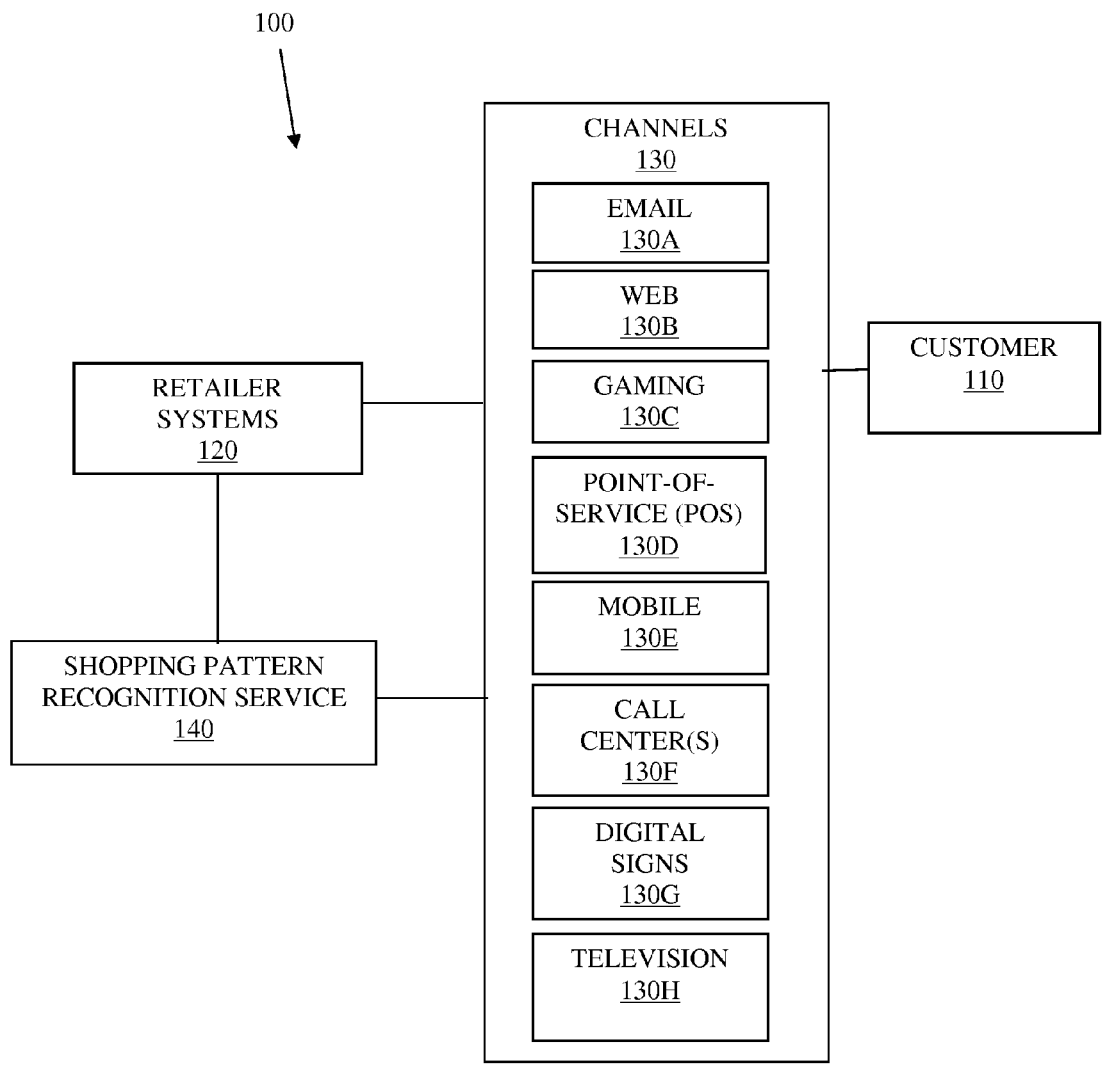
FIG. 1 is a diagram of an example architecture for utilizing shopping pattern recognition with a customer, according to an example embodiment.

FIG. 1 is a diagram of an example architecture 100 for utilizing shopping pattern recognition with a customer, according to an example embodiment. The architecture 100 is shown schematically in greatly simplified form, with only those components relevant to understanding of this embodiment being illustrated. The various components are illustrated and the arrangement of the components is presented for purposes of illustration only. It is to be noted that other arrangements with more or less components are possible without departing from the shopping pattern recognition techniques presented herein and below.

The techniques, methods, and system presented herein and below for shopping pattern recognition can be implemented in whole or in part in one, all, or some combination of the components shown with the architecture 100. The techniques and methods are programmed as executable instructions in memory and/or non-transitory computer-readable storage media and processed on one or more processors associated with the components (may also be referred to as "modules").

In the embodiment for the architecture 100, the methods and system are implemented as one or more hardware and software components of a cloud processing environment that provides shopping pattern information to retail systems for a customer of the retailer.

In the embodiment for the architecture 100, the methods and system are implemented as one or more hardware and software components of any server that is external or internal to a retailer's data center systems.

The architecture 100 includes a customer 110, retailer systems 120, a variety of sample communication channels 130 that the customer 110 uses to interact with a retail associated with one or more of the retailer systems 120, and/or a shopping pattern recognition service 140.

The customer 110 can interact with the retailer in person, on the phone, or via some device or service associated with accessing the retailer. During interaction by the customer 110, a variety of information about the customer is collected by a particular retailer's system 120. This information can include account of the customer, date and time of contact, items purchased, store purchased from, quantity of each item purchased, price paid, coupons applied, rebates or loyalty discounts, and the like. In some cases, the variety of information can be pre-acquired and stored by the shopping pattern recognition service 140, such that it does not need to be acquired during the customer interaction by the shopping pattern recognition service 140.

Most retailer systems 120 already include a plethora of such information in a customer transaction history that can potentially date back a year to a few years of interaction with the customer 110. Moreover, as the customer 110 continues to interact and make purchases with retailers, each of the retailers continues to build on the customer's transaction history within the retailer systems 120.

Some example channels 130 of communication that the customer uses to interact and purchase from a retailer are listed in the architecture 100 and include, by way of example only, an email channel 130A, a web channel 130B, a gaming device channel 130C, a Point-Of-Service (POS) (brick and mortar establishment, kiosks, Self-Service Terminals (SSTs)) 130D, a mobile channel 130E (mobile application, mobile browser, text, etc.), a call center channel 130F (to receive customer calls and orders over the phone), digital signs 130G (to interact with scan Quick Response (QR) codes from, etc.), and interactive television channels 130H.

It is to be noted that other channels 130 may exist as well and the channels 130 depicted in the FIG. 1 is not intended to be all inclusive. For example, some other channels may include human interaction (cashier, teller, waiter, etc.) printing devices, and the like.

The shopping pattern recognition service 140 provides analysis of the transaction histories that retailers have in their retail systems 120. The analysis looks in the transaction histories for at least two shopping habits associated with the customer 110, which have not been addressed in the industry in the novel manners proposed herein.

The first shopping habit is identified by mining the transaction histories on a per-product or per-service basis for a customer's consumption pattern for a particular product or service. For example, suppose a customer 110 buys one box of cornflakes once every three weeks, this is a shopping pattern for the product cornflakes and is a good indication to the shopping pattern recognition service 140 that should this particular customer 110 buy two boxes of cornflakes in one visit to a particular grocery store, then the likelihood is substantial that this customer 110 will not again want to buy cornflakes again for 6 more weeks.

The second shopping habit is a day-of-the week pattern. The shopping pattern recognition service 140 mines the transaction histories of a customer 110 to determine what types of products the customer 110 appears to be consistently buying on a particular day of the week. For example, a customer 110 may buy meat only on Fridays and is fairly consistent with that pattern.

So the shopping pattern recognition service 140 derives shopping patterns for customers 110 based on a per-product or per-service consistent and repeatable purchase pattern mined from the transaction histories and based on consistent and repeatable customer 110 purchases of types of products or services on certain days of the week.

These two types of shopping patterns enumerated above reflect how customers 110 actually behave in their daily lives. That is, a family of 4 young children may be buying two gallons of milk every two or three days. A family with a teenager may be buying pizza every Friday on payday. Existing product and service recommendation services fail to account for these patterns, which more closely reflect the habits and lifestyle of customers 110.

In an embodiment, the shopping pattern recognition service 140 is provided as a cloud-based service that retailers can subscribe to on a transactional basis or on a time-period bases (monthly, annual, etc.). The retailers provide the customer transaction histories to the shopping pattern recognition service 140 or the retailers provide access to the customer's transaction histories through an Application Programming Interface (API) that the shopping pattern recognition service 140 uses to access the retailer systems 120. So, the transaction histories can be pushed from the retailers to the shopping pattern recognition service 140 or the transaction histories can be pulled from the retailer systems 120 using a retailer-provided API.

In an embodiment, the shopping pattern recognition service 140 is provided as an on premise server to the retailers. The shopping pattern recognition service 140 may also be integrated with each of the retailer systems 120 as enhancements thereto.

In an embodiment, the identity of the customer can be anonymized by the retailer for privacy reasons, such that the shopping pattern recognition service 140 is unaware of the actual customer associated with a detected shopping pattern derived from the randomized customer's transaction history. The retailer can map the randomized customer with an identity of an actual customer for the retailer.

In an embodiment, the shopping pattern recognition service 140 can make suggestions or predictions about the customer based on the derived shopping patterns and send such suggestions or predictions with the shopping patterns to the retailers. For instance, a sample grocery list for a customer that visits the grocery every Saturday morning can be suggested for the retailer to send to the customer on Friday or some configurable period of time before Saturday. The retailer can deliver the suggested grocery list through a variety of channels such as email 130A, web 130B, mobile 130E, etc.

In another example, a retailer can be provided a suggested online shopping cart for a customer that always buys particular products online (web 130B) with determined frequency and/or on specific days of the week, such that when the customer is online, the suggested shopping cart can be pushed to the customer.

The retailer can even utilize the shopping pattern to offer coupons or rebates for products the customer is likely to buy a day or so before that customer is likely to buy the products. This may be done to ensure the customer continues to follow the shopping pattern and purchase the products or just to reward the loyal customer for the continuous purchases of the products.

In fact, the retailers may authorize the shopping pattern recognition service 140 to make the suggestions or recommendations and/or provide coupons or rebates on behalf of the retailers. This may be an upgraded service offering of the shopping pattern recognition service 140.

There are many other situations and scenarios that can occur as well. For instance, a customer visiting a kiosk or SST may receive a reminder when completing a transaction that he/she forgot to purchase something else that they usually purchase such as milk.

In another case, the suggested shopping list can be pushed to a mobile application on a mobile phone of the customer when the customer is detected in a store associated with the shopping list.

Moreover, the shopping patterns can be channel based and occur with less frequency. For example, a customer's transaction history over the course of multiple years may reveal that every year around September the customer 110 makes a large electronic purchase. This may indicate the customer receives a bonus of sorts and likes to buy electronics with at least some of the funds. Having this shopping pattern permits a retailer to offer discounts on newer and more expensive electronics in August for purchase in September.

Other scenarios that utilize the shopping patterns to improve customer-relationship management are also intended to fall within the generous scope of the embodiments presented herein.

Some of the above-noted aspects of the invention and other aspects are now presented and discussed with reference to the FIGS. 2-4.

Figure 2:
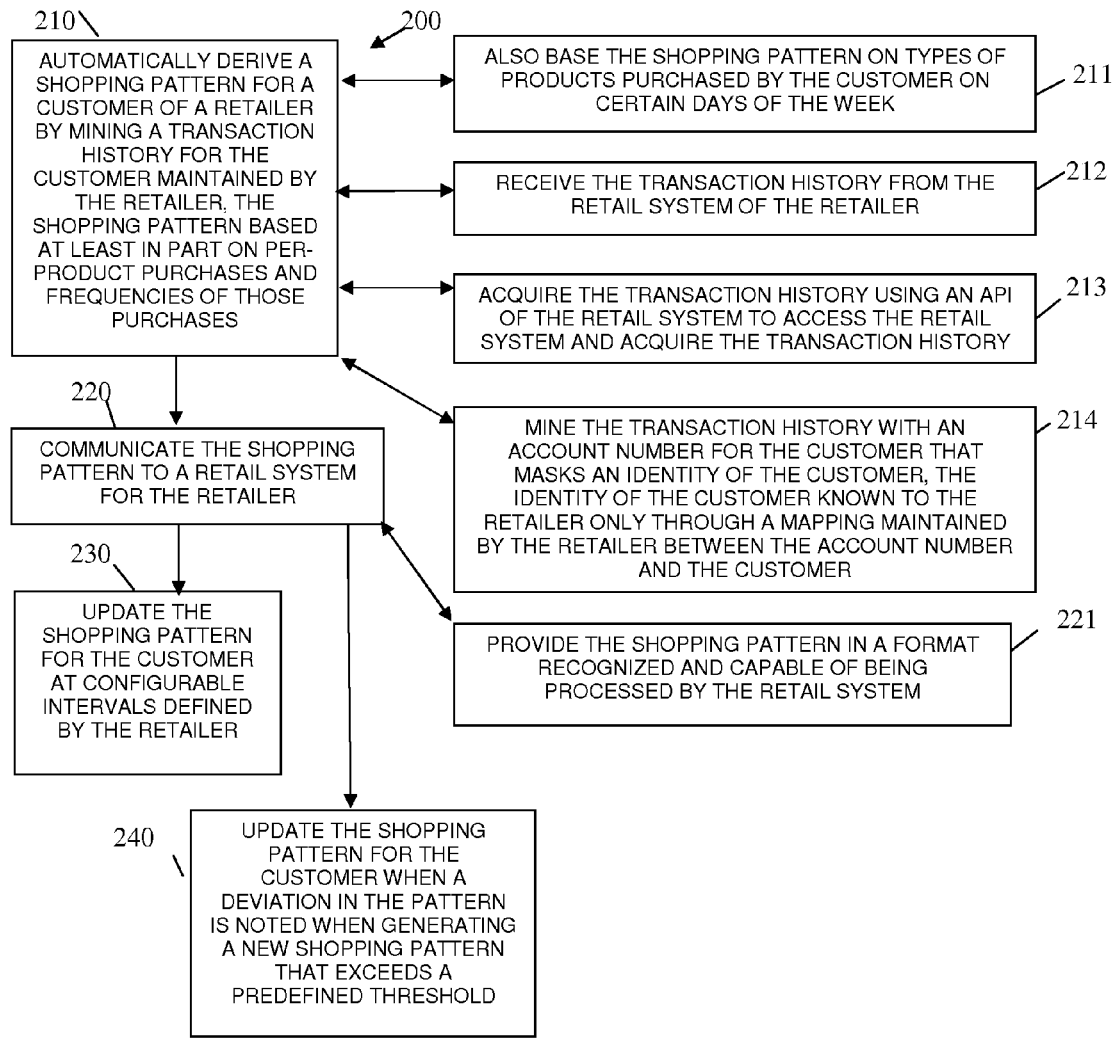
FIG. 2 is a diagram of a method for utilizing shopping patterns of a customer, according to an example embodiment.

FIG. 2 is a diagram of a method 200 for utilizing shopping patterns of a customer, according to an example embodiment. The software module(s) that implements the method 200 is referred to as a "shopping pattern manager." The shopping pattern manager is implemented as executable instructions programmed and residing within memory and/or a non-transitory computer-readable (processor-readable) storage medium and executed by one or more processors of one or more devices. The processors of the device(s) that executes the shopping pattern manager are specifically configured and programmed to process the shopping pattern manager. The shopping pattern manager has access to one or more networks during its processing. The networks can be wired, wireless, or a combination of wired and wireless.

According to an embodiment, the device that executes the software module(s) representing the shopping pattern manager is a cloud processing environment.

In an embodiment, the device that executes the software module(s) representing the shopping pattern manager is integrated within one or more of the retailer systems 120 of FIG. 1.

In an embodiment, the shopping pattern manager is the shopping pattern recognition service 140 of the FIG. 1.

At 210, the shopping pattern manager automatically derives a shopping pattern for a customer of a retailer by mining a transaction history for the customer maintained by the retailer. The shopping pattern based at least in part on per-product purchases and frequencies of those purchases. In other words, a specific product that is identified as being purchased on a frequent basis is extracted from the transaction history as part of the shopping pattern. The pattern may use a unique identifier for the product and include quantity of product purchased in each transaction and the frequency of the product purchases.

In an embodiment, the retail system is the retailer systems 120 of FIG. 1.

According to an embodiment, at 211, the shopping pattern manager also bases the shopping pattern on types of products purchased by the customer on certain days of the week. So, the pattern may use a unique identifier for a category or type of product and include a quantity of type of product purchased along with the most frequently occurring day of the week that the type of product is purchased. Again, these factors captured in the shopping pattern more closely align with habits of the customer.

In an embodiment, at 212, the shopping pattern manager receives the transaction history from the retail system of the retailer, which results in a push scenario.

In an embodiment, at 213, the shopping pattern manager acquires the transaction history using an API of the retail system to access the retail system and acquire the transaction history, which results in a pull scenario.

In an embodiment, at 214, the shopping pattern manager mining the transaction history with an account number for the customer that masks an identity of the customer. The identity of the customer known to the retailer only through a mapping maintained by the retailer between the account number and the customer. This is a scenario where the retailer is protecting the true identity and confidential information of the customer (name, address, credit card, phone number, etc.) from the shopping pattern manager.

At 220, the shopping pattern manager communicates the shopping pattern to a retail system for the retailer.

In an embodiment, at 221, the shopping pattern manager provides the shopping pattern in a format recognized and capable of being processed by the retail system. So, the shopping pattern manager can service multiple different retailers and custom deliver the shopping patterns derived in formats that each of the retailer's retail system can recognize and process.

According to an embodiment, at 230, the shopping pattern manager updates the shopping pattern for the customer at configurable intervals defined by the retailer.

In an embodiment, at 240, the shopping pattern manager updates the shopping pattern for the customer when a deviation in the pattern is noted when generating a new version of the shopping pattern that exceeds a predefined threshold (this is but one example of determining a sufficient deviation in the pattern, others techniques can be used as well without departing from the teachings presented herein). This may occur when a life situation changed for the customer, such as a move, a birth or death, a disability, etc. But, can be detected in a variety of manners, one such manner is when the deviation is compared to the threshold. Also, statistical outliers may be noted based on the deviation and removed from updating the shopping pattern, such as when a customer is on a vacation, the period of that vacation is regarded as an outlier and removed from consideration of updating or generating the shopping pattern.

Figure 3:
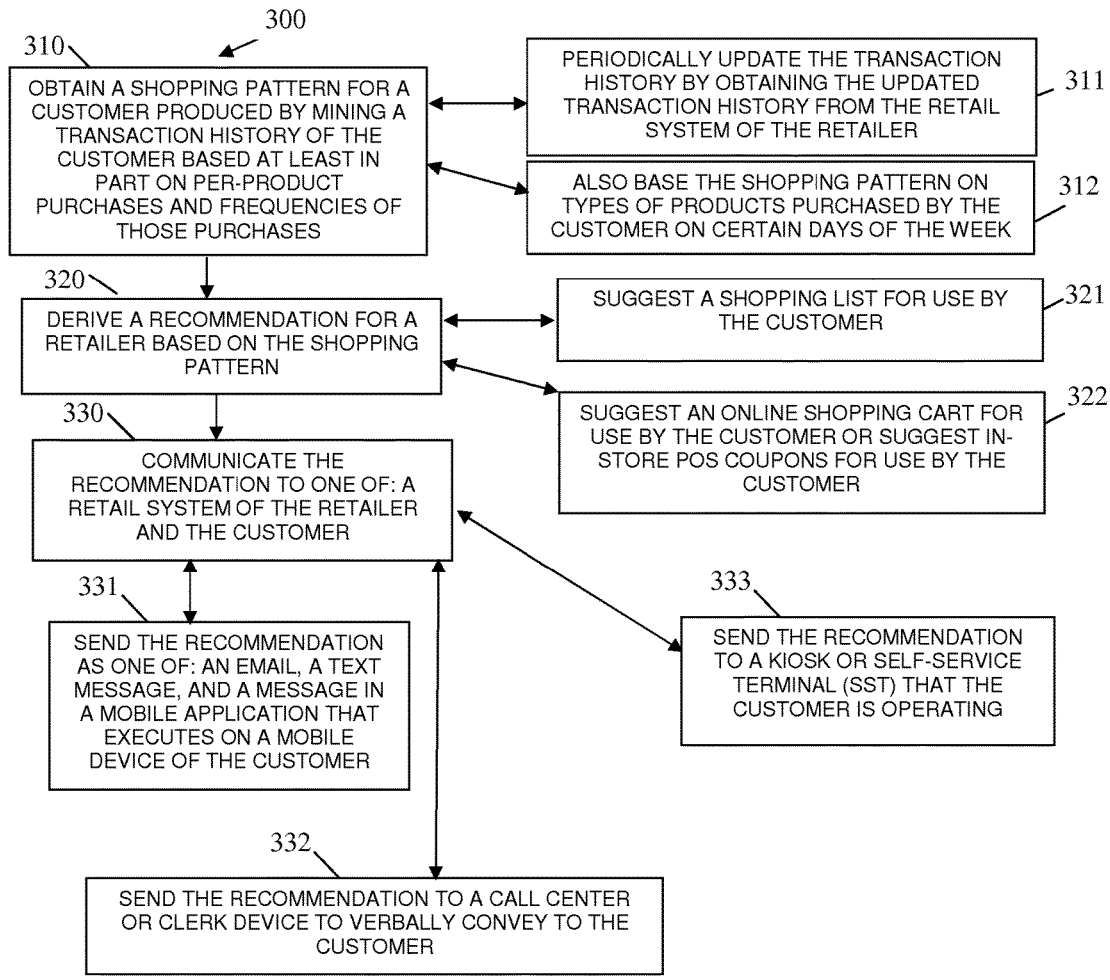
FIG. 3 is a diagram of another method for utilizing shopping patterns of a customer, according to an example embodiment.

FIG. 3 is a diagram of another method 300 for utilizing shopping patterns of a customer, according to an example embodiment. The software module(s) that implements the method 300 is referred to as a "shopping recommendation service." The shopping recommendation service is implemented as executable instructions programmed and residing within memory and/or a non-transitory computer-readable (processor-readable) storage medium and executed by one or more processors of one or more devices. The processors of the device(s) that executes the shopping recommendation service are specifically configured and programmed to process the shopping recommendation service. The shopping recommendation service has access to one or more networks during its processing. The networks can be wired, wireless, or a combination of wired and wireless.

In an embodiment, the shopping recommendation service is the shopping pattern recognition service 140 of the FIG. 1.

In an embodiment, the device that executes the software modules representing the shopping recommendation service is a cloud or server.

In an embodiment, the device that executes the software modules representing the shopping recommendation service is integrated into the retailer systems 120 of FIG. 1.

At 310, shopping recommendation service obtains a shopping pattern for a customer produced by mining a transaction history of the customer based at least in part on per-product purchases and frequencies of those purchases. The manner of generating the shopping pattern was discussed above with reference to the FIG. 2.

In an embodiment, at 311, the shopping recommendation service periodically updates the transaction history by obtaining the updated transaction history from the retail system of the retailer.

In an embodiment, the retail system is the retailer systems 120 of FIG. 1.

In an embodiment, at 312, the shopping recommendation service also bases the shopping pattern on types of products purchased by the customer on certain days of the week. This too was described above with reference to the FIG. 2.

At 320, the shopping recommendation service derives a recommendation for a retailer based on the shopping pattern.

In an embodiment, at 321, the shopping recommendation service suggests a shopping list for use by the customer, such as a grocery list, and other types of shopping lists.

In an embodiment, at 322, the shopping recommendation service suggests an online shopping cart for use by the customer or suggest in-store POS coupons for use by the customer (via electronic delivery to the customer, in-store printing by the customer, or customer printing at home).

At 330, the shopping recommendation service communicates the recommendation to one of: a retail system of the retailer and the customer.

In an embodiment, at 331, the shopping recommendation service sends the recommendation as one of: an email, a text message, and a message in a mobile application that executes on a mobile device of the customer.

In an embodiment, at 332, the shopping recommendation service sends the recommendation to a call center or clerk device to verbally convey the recommendation to the customer.

In an embodiment, at 333, the shopping recommendation service sending the recommendation to a kiosk or SST that the customer is operating.

Figure 4:
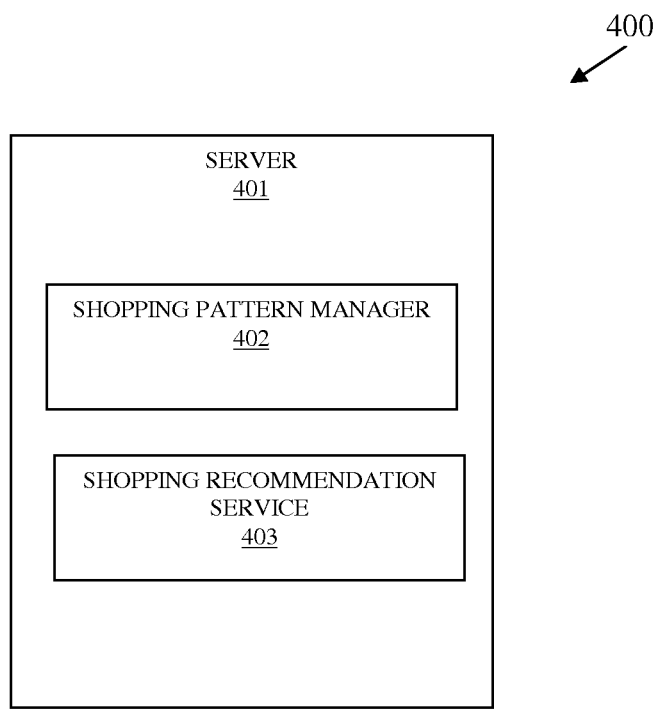
FIG. 4 is a diagram of a shopping pattern recognition system, according to an example embodiment.

FIG. 4 is a diagram of a shopping pattern recognition system 400, according to an example embodiment. Various components of the shopping pattern recognition system 400 are programmed and reside within memory and/or a non-transitory computer-readable medium and execute on one or more processors of one or more devices. The shopping pattern recognition system 400 has access and can communicate over one or more networks; and the networks can be wired, wireless, or a combination of wired and wireless.

The shopping pattern recognition system 400 includes a server 401, a shopping pattern manager 402, and a shopping recommendation service 403.

In an embodiment, the server 401 is part of a cloud processing environment.

In an embodiment, the shopping pattern manager 402 is the shopping pattern recognition service 140 of the FIG. 1.

In an embodiment, the shopping recommendation service 403 is the shopping pattern recognition service 140 of the FIG. 1.

In an embodiment, both the shopping pattern manager 402 and the shopping recommendation service 403 are both part of the shopping pattern recognition service 140 of the FIG. 1.

In an embodiment, the shopping pattern manager 402 is the method 200 of the FIG. 2.

In an embodiment, the shopping recommendation service 403 is the method 300 of the FIG. 3.

Accordingly, the embodiments and processing discussed in the FIGS. 1-3 are incorporated by reference herein with the embodiments and processing for the shopping pattern recognition system 400.

The shopping pattern manager 402 is configured and adapted to: execute on one or more processors of the server 401, mine a transaction history of a customer based at least in part on per-product purchases and frequencies of those purchases to generate a shopping pattern for the customer.

In an embodiment, the shopping pattern manager 402 is further adapted and configured to also base the shopping pattern on types of products purchased by the customer on certain days of the week.

The shopping recommendation service 403 is configured and adapted to: execute on one or more processors of the server 401, make a recommendation based on the shopping pattern, and deliver the recommendation directly or indirectly to the customer.

In an embodiment, the shopping recommendation service 403 is further adapted and configured to send the recommendation directly to a device of or operated by the customer.

In an embodiment, the shopping recommendation service 403 is further adapted and configured to send the recommendation indirectly to the customer through one of: a retail system of the retailer, a call center operator's device, and a clerk's device for a clerk interfacing with the customer.

One now appreciates that the methods and system provided herein provide a variety of novel benefits, some of these, by way of example only include:

improved shopping experiences for the customer;

improved existing online shopping systems by providing a service that recommends potentially forgotten items in an existing shopping cart before online checkout;

increased customer loyalty due to switching costs; once a retailer offers the customer items based on his/her long term shopping patterns, switching to another retailer results in less accurate recommendations; and increased sales per customer order, assuming a customer has a limited amount of shopping time, the algorithm allows to customer to build his order in less time, hence time limitations impose weaker effects on the total sales amount.

It should be appreciated that where software is described in a particular form (such as a component or module) this is merely to aid understanding and is not intended to limit how software that implements those functions may be architected or structured. For example, some modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the description of the embodiments, with each claim standing on its own as a separate exemplary embodiment.

The invention claimed is:

1. A method, comprising:

automatically deriving, by executable instructions executing on a hardware processor from a non-transitory computer-readable storage medium of a cloud processing environment as a shopping pattern manager, a shopping pattern for a customer of a retailer by:

mining a transaction history for the customer maintained by the retailer using a randomized identity for the customer provided by the retailer with the transaction history with the retailer maintaining a mapping from the randomized identity to an actual identity ensuring that the customer remains anonymous to the shopping pattern manager and ensuring privacy of the customer is maintained through hiding of the actual identity from the shopping pattern manager;

wherein the shopping pattern is derived based, at least in part, on: per-product purchase patterns and days-of-week patterns associated with each purchase made by the customer on an individual product basis by identifying the per-product purchase patterns and the days-of-week patterns from the transaction history associated with the randomized identity;

wherein the shopping pattern is communication channel specific for a specific communication channel identified with the shopping pattern;

wherein the specific communication channel is selected from a plurality of communication channels that at least includes a mobile channel, an interactive television channel, a web channel, an email channel, a Point-Of-Sale Channel, and a call center channel;

communicating, by the shopping pattern manager, the shopping pattern and an identification of the specific channel to a retail system for the retailer; and providing, by the shopping pattern manager, a recommendation to the retail system for a specific product at a specific time for the customer over the specific communication channel based on the shopping pattern for the retail system to deliver the recommendation to the customer over the specific communication channel at the specific time.

2. The method of claim 1, wherein automatically deriving further includes also basing the shopping pattern on types of products purchased by the customer on certain days of the week.

3. The method of claim 1, wherein automatically deriving further includes receiving the transaction history from the retail system of the retailer.

4. The method of claim 1, wherein automatically deriving further includes acquiring the transaction history using an Application Programming Interface of the retail system to access the retail system and acquire the transaction history.

5. The method of claim 1, wherein automatically deriving further includes mining the transaction history with an account number for the customer that masks an identity of the customer, the identity of the customer known to the retailer only through a mapping maintained by the retailer between the account number and the customer.

6. The method of claim 1, wherein communicating further includes providing the shopping pattern in a format that the retail system can process.

7. The method of claim 1 further comprising, updating the shopping pattern for the customer at configurable intervals defined by the retailer.

8. The method of claim 1 further comprising, updating the shopping pattern for the customer when a deviation in the pattern is noted when generating a new shopping pattern.

9. A method, comprising:
obtaining, by executable instructions executing on a hardware processor from a non-transitory computer-readable storage medium of a cloud processing environment as a shopping recommendation manager, a shopping pattern for a customer produced by:
receiving a randomized identity associated with the customer from a retailer, wherein the retailer maintains a mapping between the randomized identity and an actual identity for the customer ensuring privacy of the customer is maintained with respect to the shopping recommendation manager;
receiving a transaction history associated with the randomized identity from the retailer;
mining the transaction history of the customer based, at least in part, on per-product purchase patterns and days-of-week patterns associated with each purchase of the customer on an individual product basis and frequencies of those purchases and based on a specific communication channel identified for the shopping pattern that is selected from a plurality of communication channels by identifying the per-product purchase patterns and the days-of-week patterns from the transaction history;
wherein the plurality of communication channels include: a mobile channel, an interactive television channel, a web channel, an email channel, a Point-Of-Sale Channel, and a call center channel;
deriving, by the shopping recommendation manager, a recommendation for the retailer based on the shopping pattern, wherein deriving further includes deriving the recommendation as a specific product offering for the customer that is to be made to the customer at a specific time over the specific communication channel; and
communicating, by the shopping recommendation manager, the recommendation over the specific communication channel at the specific time to: a retail system of the retailer or the customer by using information provided by the retailer for the customer.

10. The method of claim 9, wherein obtaining further includes periodically updating the transaction history by obtaining the updated transaction history from the retail system of the retailer.

11. The method of claim 9, wherein obtaining further includes also basing the shopping pattern on types of products purchased by the customer on certain days of the week.

12. The method of claim 9, wherein deriving further includes suggesting a shopping list for use by the customer.

13. The method of claim 9, wherein deriving further includes suggesting an online shopping cart for use by the customer or suggesting in-store Point-Of-Sale (POS) coupons for use by the customer.

14. The method of claim 9, wherein communicating further includes sending the recommendation as one of:
an email, a text message, and a message in a mobile application that executes on a mobile device of the customer.

15. The method of claim 9, wherein communicating further includes sending the recommendation to a call center or clerk device to verbally convey to the customer.

16. The method of claim 9, wherein communicating further includes sending the recommendation to a kiosk or Self-Service Terminal (SST) that the customer is operating.

17. A system, comprising:
a server including:
a non-transitory computer-readable storage medium that includes executable instructions representing a shopping pattern manager and a shopping recommendation service;
a hardware processor; and
the shopping pattern manager when executed on the hardware processor, cause the hardware processor to:
mine a transaction history of a customer based at least in part on per-product purchase patterns and days-of-week patterns associated with each purchase of the customer on an individual product basis by identifying the per-product purchase patterns and the days-of-week patterns from the transaction history and frequencies of those purchases to generate a shopping pattern for the customer;
associate a specific communication channel that is identified with the shopping pattern;
wherein the specific communication channel is selected from a plurality of communication channels that at least includes: a mobile channel, an interactive television channel, a web channel, an email channel, a Point-Of-Sale Channel, and a call center channel;
wherein the shopping manager receives the transaction history from a retailer with a randomized identity for the customer and the retailer maintains a mapping between the randomized identity and an actual identity for the customer to ensure that the actual identity of the customer remains anonymous to the shopping pattern manager and a shopping recommendation service and to ensure privacy is maintained for the customer with respect to the shopping pattern manager and the shopping recommendation service;

make a recommendation based on the shopping pattern and the specific communication channel for a specific product during a specific time for delivery to the customer;

directly deliver the recommendation, through information provided by the retailer, to the customer or indirectly deliver the recommendation to the customer through the retailer with the retailer directly delivering the recommendation to the customer; and process the server as part of a cloud processing environment.

18. The system of claim 17, wherein the shopping pattern manager is further adapted and configured to also base the shopping pattern on types of products purchased by the customer on certain days of the week.

19. The system of claim 17, wherein the shopping recommendation service is further adapted and configured to send the recommendation directly to a device of the customer.

20. The system of claim 17, wherein the shopping recommendation service is further adapted and configured to send the recommendation indirectly to the customer through one of:

a retail system of the retailer, a call center operator's device, and a clerk's device for a clerk interfacing with the customer.

* * * * *